UNITED STATES PATENT OFFICE.

WM. E. LOCKWOOD, OF PHILADELPHIA, PENNSYLVANIA, ASSIGNEE, BY MESNE ASSIGNMENTS, OF WALTER HUNT.

IMPROVEMENT IN SHIRT-COLLARS.

Specification forming part of Letters Patent No. 11,376, dated July 25, 185 ; Reissue No. 1,926, dated April 4, 1865.

DIVISION A.

*To all whom it may concern:*

Be it known that I, WILLIAM E. LOCKWOOD, of Philadelphia, Pennsylvania, am the owner of certain Letters Patent for an Improvement in Shirt-Collars, granted to WALTER HUNT on the 25th day of July, 1854; that I deem the said patent inoperative and invalid by reason of a defective specification; and I do hereby declare that the following is a full, clear, and exact description of that part of said invention, which consists in so indenting shirt-collars, made of a fabric composed of paper and muslin, or an equivalent fabric, that the indentation will represent the stitches of an ordinary dressed linen collar.

The said WALTER HUNT made shirt-collars of white paper, strengthened and stiffened by the interposition of muslin secured to two sheets of the paper, the fabric thus composed being polished by passing it through calendering-rollers, or by other suitable means, the collars to be afterward shaped, if desired, by dies or formers applied under pressure, to adapt them to the wearer's neck. The collars thus formed were provided with the requisite button-holes, and indentations were made near the edge of the collar, to represent the row or rows of stitches of an ordinary dressed linen collar.

It is evident that the invention is adapted to shirt-bosoms, wristbands, &c.

I claim as the invention of the said WALTER HUNT, and desire to secure by Letters Patent—

So indenting shirt-collars made of a fabric composed of paper and muslin, or an equivalent fabric, that the indentations will represent the stitches of an ordinary dressed linen collar.

In testimony whereof I have signed my name to this specification before two subscribing witnesses.

WILLIAM E. LOCKWOOD.

Witnesses:
HENRY HOWSON,
JOHN WHITE.